(12) United States Patent
Kanellakopoulos et al.

(10) Patent No.: US 8,576,899 B2
(45) Date of Patent: Nov. 5, 2013

(54) METHOD AND SYSTEM FOR ROBUST DIGITAL SUBSCRIBER LOOP COMMUNICATION

(75) Inventors: Ioannis Kanellakopoulos, Cupertino, CA (US); Amit Levy, Kiryat Bialik (IL); Tuvia Barlev, Palo Alto, CA (US); Maya Bar-El, Hod-Hasharon (IL); Amit Priebatch, Kfar Saba (IL); Eitan Tsur, Rishon LeZion (IL)

(73) Assignee: Actelis Networks (Israel) Ltd., Petach Tikva (IL)

( * ) Notice: Subject to any disclaimer, the term of this patent is extended or adjusted under 35 U.S.C. 154(b) by 254 days.

(21) Appl. No.: 13/057,967

(22) PCT Filed: Aug. 19, 2009

(86) PCT No.: PCT/US2009/054346
§ 371 (c)(1),
(2), (4) Date: Jun. 13, 2011

(87) PCT Pub. No.: WO2010/022174
PCT Pub. Date: Feb. 25, 2010

(65) Prior Publication Data
US 2011/0235692 A1    Sep. 29, 2011

Related U.S. Application Data

(60) Provisional application No. 61/090,095, filed on Aug. 19, 2008.

(51) Int. Cl.
*H04B 1/38* (2006.01)
*H04L 5/16* (2006.01)

(52) U.S. Cl.
USPC ........... 375/222; 375/224; 375/257; 375/259; 370/201

(58) Field of Classification Search
USPC ........... 375/219, 222, 224, 225, 227, 257, 375/259–260, 295; 370/201
See application file for complete search history.

(56) References Cited

U.S. PATENT DOCUMENTS

| | | | |
|---|---|---|---|
| 7,046,751 B1 | 5/2006 | Kantschuk et al. | |
| 7,133,441 B1 | 11/2006 | Barlev et al. | |
| 2002/0118733 A1* | 8/2002 | Frenkel | 375/219 |
| 2003/0001586 A1* | 1/2003 | Warke | 324/527 |
| 2003/0099286 A1* | 5/2003 | Graziano et al. | 375/222 |
| 2003/0123560 A1* | 7/2003 | Jacobsen et al. | 375/260 |
| 2005/0220180 A1 | 10/2005 | Barlev et al. | |

OTHER PUBLICATIONS

International Search Report for International Application No. PCT/US2009/054346 mailed Oct. 8, 2009.

* cited by examiner

*Primary Examiner* — Jean B Corrielus
(74) *Attorney, Agent, or Firm* — Pearl Cohen Zedek Latzer Baratz, LLP

(57) ABSTRACT

A DSL communication system and a method for configuring a DSL communication system. The method includes training at least one anchor DSL modem transmitter to transmit information over at least one anchor line at an anchor bit rate that is determined based on an allowable tolerable noise level and a minimum allowable signal-to-noise ratio (SNR) margin; training one or more other DSL modem transmitter to transmit information over one or more other line at a bit rate that is determined by a current noise level and a target SNR margin, wherein the target SNR margin is higher than the minimum allowable SNR margin; and transmitting information by at least one trained DSL modem transmitter to at least one DSL modem receiver.

41 Claims, 10 Drawing Sheets

| | |
|---|---|
| Calculating, for each line of the bonded link, a minimum line bit rate that corresponds to the minimum allowable SNR margin and to an allowable tolerable line noise level. | 741 |
| Selecting at least one anchor line so that a sum of minimum line bit rates of the anchor lines is not lower than a bonded link minimum bit rate. | 742 |
| Ranking lines of the bonded link according to increasing excess line bit rate gained from applying self crosstalk cancellation; and selecting the at least one anchor line based on the ranking of the lines. | 743 |
| Calculating, for each line of the bonded link, a current line bit rate that corresponds to the target SNR margin and to a current line noise level at an absence of self crosstalk cancellation. | 744 |
| Calculating, for each line of the bonded link, a current line bit rate that corresponds to the target SNR margin and to a current line noise level assuming that self crosstalk cancellation is applied. | 745 |
| Arbitrarily selecting the at least one anchor lines. | 746 |
| Selecting an anchor line based on a possible exposure of the anchor line to noise induced by one or more noise inducing lines, wherein the noise may not be cancelled by self crosstalk cancellation. | 747 |
| Ranking lines of the bonded link based on a number of noise inducing lines that are expected to induce noise that is indifferent to self crosstalk cancellation. | 748 |
| Calculating the allowable tolerable noise level based on a self crosstalk cancellation applied on the at least one anchor line. | 749 |
| Calculating the allowable tolerable noise level at an absence of self crosstalk cancellation. | 750 |
| Calculating the allowable tolerable noise level based on a maximum allowable number of disturbers and an estimation of a noise level that is generated at the at least one line due to the disturbers. | 751 |

| | |
|---|---|
| Training at least one anchor DSL modem transmitter to transmit information over at least one anchor line at an anchor bit rate that is determined based on an allowable tolerable noise level and a minimum allowable signal-to-noise ratio (SNR) margin and training at least one or more other DSL modem transmitter to transmit information over one or more other line at a bit rate that is determined based on a current noise level and a target SNR margin, wherein the target SNR margin is higher than the minimum allowable SNR margin. | 781 |
| Training each anchor DSL modem transmitter to transmit at a minimum line bit rate of the selected line. | 782 |
| Training at least one anchor DSL modem transmitter to transmit information over at least one anchor link at the anchor bit rate that is determined based on the selected allowable tolerable noise level and to the minimum allowable SNR margin. | 783 |
| Training a minimum number of anchor DSL modem transmitters to transmit information over one or more anchor link at the anchor bit rate, wherein the anchor bit rate is determined based on the allowable tolerable noise level and to the minimum allowable SNR margin. | 784 |
| Training at least one further DSL modem transmitter to transmit information over at least one further link at a further bit rate that is determined based on an intermediate noise level and an intermediate SNR margin; wherein the intermediate SNR margin is lower then the target SNR margin and higher than the minimum SNR margin. | 785 |
| Training at least one anchor DSL modem transmitter to transmit information over at least one anchor line at an anchor bit rate that is determined based on the allowable tolerable noise level, the minimum allowable SNR margin and at least one parameter out of a attenuation of the anchor line, equivalent working length of a loop that comprises the anchor line and a quiet anchor line noise. | 786 |
| Training at least one anchor DSL modem transmitter to transmit information over at least one anchor line at an anchor bit rate and at an anchor bitloading map that are determined based on the allowable tolerable noise level and to the minimum allowable SNR margin; | 787 |

METHOD AND SYSTEM FOR ROBUST DIGITAL SUBSCRIBER LOOP COMMUNICATION

CROSS-REFERENCE TO RELATED APPLICATIONS

This application is a National Phase Application of PCT International Application No. PCT/US2009/054346, entitled "METHOD AND SYSTEM FOR ROBUST DIGITAL SUBSCRIBER LOOP COMMUNICATION", International Filing Date Aug. 19, 2009, published on Feb. 25, 2010 as International Publication No. WO 2010/022174, which in turn claims priority from US Provisional Patent Application No. 61/090,095, filed Aug. 19, 2008, both of which are incorporated herein by reference in their entirety.

FIELD OF THE INVENTION

The present invention relates to robust Digital Subscriber Loop (DSL) communication systems.

BACKGROUND OF THE INVENTION

One of the most effective and efficient methods of deploying high-speed digital services to business and residential customers is to use one of the many forms of DSL (Digital Subscriber Loop) technologies over copper telephone wires. This approach has become very popular in the last 20 years due to the fact that copper wires are already deployed almost everywhere and are quite easy to access, both at the Central Office (CO) and at the Remote Terminal (RT) or the Customer Premises Equipment (CPE).

However, one of the main limitations of DSL technology is that the data capacity of copper wires decreases significantly as the length of the copper loop increases. Therefore, service providers may not be able to offer services with high data speeds over copper wires to customers located more than a few kilometers from the Central Office.

One way to mitigate this issue is to use multiple copper pairs to the same customer location, thereby increasing the total data rate of the resulting multi-pair copper link. This method is typically referred to as "bonding" of copper pairs.

Another significant limitation of DSL technology is the significant spectral interference between DSL services deployed on different twisted copper pairs in the same cable. Spectral interference between different high-bit rate services in a copper cable is caused by the fact that each copper pair acts as an antenna. The signal transmitted on each copper pair, which is intended for the receiver located at the other end of that copper pair, is also inadvertently picked up by all of the neighboring copper pairs, because those pairs are not individually shielded from each other. This creates the well-known phenomenon of "crosstalk", aptly named for the effect it caused in the early days of the telephone, when the telephone discussion taking place on one line could sometimes be overheard by the people conversing on a different line.

Due to the physical characteristics of copper pairs, and in particular due to the average length of the twist between the two copper wires making up each pair, the crosstalk coupling between different pairs increases exponentially with the frequency of the transmitted signal. But this crosstalk coupling is only one of the three factors that determine the strength of crosstalk. The other two are the strength of the disturbing transmitter (typically referred to as a "disturber") and the sensitivity of the disturbed receiver (typically referred to as a "victim") at any given frequency. For example, if the transmit frequency band of the disturber is different than the receive frequency band of the victim, then there will be almost no crosstalk.

Crosstalk typically consists of Near-End Crosstalk (NEXT), caused by disturbers located at the "near-end", i.e., on the same side (network side or customer side) of the copper loop as the victim's receiver, and Far-End Crosstalk (FEXT), caused by disturbers located at the "far-end", i.e., on the opposite side of the copper loop from the victim's receiver.

The problem of crosstalk is often more pronounced in systems utilizing bonding of copper pairs, because a bonded link always involves multiple copper pairs, and these multiple copper pairs have the potential of generating crosstalk to each other.

The severe deterioration in the data capacity of copper wires due to crosstalk has sparked significant innovation in crosstalk-reduction methods. These methods typically aim to reduce self-crosstalk and/or alien crosstalk, are defined as follows:

"Self-crosstalk", which consists of self-NEXT and self-FEXT, is generated by transmitters connected to other lines that are physically connected to the same DSL equipment as the victim's line on at least one side of the loop (i.e., on the CO side or the RT side).

"Alien crosstalk", which consists of alien NEXT and alien FEXT, is generated by transmitters connected to lines that are physically connected to different DSL equipment than the victim's line on both sides of the loop (i.e., on both the CO side and the RT side).

In the case of self-crosstalk, the fact the disturbing lines and disturbed lines are connected to the same DSL equipment implies that the signals transmitted on the disturbing lines are known. This means that the disturbed lines can take advantage of that knowledge to essentially cancel self-crosstalk. This basic principle has been implemented in various forms of self-crosstalk cancellation, such as the three methods discussed below.

Gigabit Ethernet links transmit data at a rate of 1 Gbps in each direction (upstream and downstream) by bonding four copper pairs, with 250 Mbps of data transmitted on each of the four pairs, with the upstream and downstream transmitters using the same frequency band. The strong self-NEXT generated between the four copper pairs is cancelled on each side of the loop using time-domain filters that essentially form a 4×4 matrix echo canceller.

SHDSL (Single-pair High-Speed DSL) bonded links use multiple copper pairs, each of which may carry data at a different symmetric bit rate, with the upstream and downstream transmitters using the same frequency band. The self-NEXT generated between these copper pairs may be cancelled on each side of the loop using time-domain filters that essentially form an N×M matrix echo canceller, where N is the number of copper pairs in the bonded link, and M is the number of crosstalk sources that are cancelled. Using the same approach, self-NEXT can also be cancelled between lines that do not belong to the same bonded link, at least in the case where the disturbing transmitters and victim receivers are connected to the same DSL equipment on that side of the loop.

VDSL (Very-high-speed DSL) uses different frequency bands for upstream and downstream transmission. Therefore, lines that carry VDSL services do not generate self-NEXT to each other. However, since VDSL is typically deployed on short loops, self-FEXT is a significant concern. Self-FEXT can be eliminated between lines belonging to the same bonded link by building a matrix receiver that utilizes the crosstalk from other modems as part of the main received signal. Self-FEXT can also be cancelled between lines that do not belong to the same bonded link, even if the disturbing transmitters and victim receivers are only connected to the same DSL equipment on one side of the loop. This means, for example, that self-FEXT can be cancelled between DSL lines serving different customer locations, as long as they originate from the same DSL equipment on the CO-side of the loop. Self-FEXT cancellation is possible because the disturbing signals are available in the same location, either on the transmitter side for downstream signals, or on the receiver side for upstream signals. Therefore, downstream self-FEXT can be cancelled by pre-coding the transmitted signals with crosstalk-cancelling additional signals, and upstream self-FEXT can be cancelled by decoding the received signals and subtracting the crosstalk effects of each of those received signals from the other received signals.

In the case of alien crosstalk, the modems on the disturbed lines do not have access to the signals transmitted on the disturbing lines. Therefore, alien crosstalk cannot be precisely cancelled. However, its effects can be mitigated. This may be achieved by correlating the received crosstalk noise across multiple receivers, and removing the correlated part of the noise from at least some of these receivers, thereby increasing the data capacity of the corresponding lines. This type of correlation-based scheme may result in noticeable performance benefits as long as the number of significant crosstalk sources (i.e., the number of strongly disturbing alien transmitters) is lower than the number of disturbed receivers whose noises are correlated.

All of these crosstalk cancellation and crosstalk mitigation schemes result in increased Signal-to-Noise Ratio (SNR) for the corresponding victim receivers. This SNR increase is typically used to increase the bit rate of the victim receiver. Alternatively, the signal power of the corresponding transmitter may be reduced using Power Back-Off (PBO) methods; this results in reduced spectral interference of the corresponding line to neighboring receivers while maintaining the original bit rate. These two approaches may also be combined, converting part of the increased SNR to increased bit rate while also reducing the transmitted power to reduce spectral interference.

However, the benefits of crosstalk reduction are still subject to the inescapable tradeoff between performance and robustness. A receiver that is operating with increased bit rate and/or reduced transmit signal power as a result of self-crosstalk cancellation or alien crosstalk mitigation may be impacted more by the addition of new noise sources on neighboring lines, especially if those new noise sources cannot be cancelled or mitigated. For example, a DSL line benefitting from crosstalk reduction may be impacted more by new DSL services added in a public telephone network than a DSL line that does not use crosstalk reduction.

The reason for this increased sensitivity to new noise sources can be traced back to the nonlinear relationship between noise power and data capacity. When a DSL line is operating in a crosstalk-free environment, its SNR and therefore its data capacity is typically limited only by the signal attenuation of the corresponding copper pair and by the internal noise floor of its own receiver. As new DSL lines are added to the same operating environment, their crosstalk noise raises the noise floor of the original line. What is important, however, is that the first few noise sources typically result in a significant reduction in the data capacity of the original line, while noise sources added later on typically have a much less adverse effect. This is because the data capacity of a DSL line or any other communication channel is a logarithmic function of the ratio of received signal power and received noise power.

When the environment is free of crosstalk and other interference noise, the total noise power on a DSL receiver is typically very small, on the order of 1 nW (one nanoWatt). Every new DSL line that is added on a neighboring copper pair generates crosstalk noise with total power on the order of 100 nW. Therefore, the first crosstalk source may decrease the SNR by about 20 dB, while the second crosstalk source may only decrease the SNR by an additional 3 dB. In typical DSL deployment scenarios, the first three to four disturbers added in the operating environment may reduce the SNR by about 25 dB or more, while the next three to four disturbers may only decrease the SNR by an additional 3-4 dB.

When crosstalk reduction methods are utilized in DSL networks, some of the DSL lines in those networks may operate in a nearly crosstalk-free environment. Therefore, when new crosstalk sources (i.e., new DSL lines) are added to their operating environment, these DSL lines are subject to significant SNR reductions as discussed above. If the SNR increase resulting from the crosstalk reduction had been used to either increase the bit rate or reduce the transmit power or both, the sudden SNR reduction may necessitate a re-training of the affected DSL line, resulting in a temporary interruption of service on that line.

Therefore, it would be highly desirable to find a method that improves the tradeoff between increased performance and reduced robustness on DSL lines that utilize crosstalk reduction methods.

SUMMARY OF EMBODIMENTS OF THE INVENTION

A method for configuring a digital subscriber loop (DSL) communication system, the method includes: training at least one anchor DSL modem transmitter to transmit information over at least one anchor line at an anchor bit rate that is determined based on an allowable tolerable noise level and a minimum allowable signal-to-noise ratio (SNR) margin; training one or more other DSL modem transmitter to transmit information over one or more other line at a bit rate that is determined based on a current noise level and a target SNR margin, wherein the target SNR margin is higher than the minimum allowable SNR margin; and transmitting information by at least one trained DSL modem transmitter; wherein the at least one anchor link and the one or more other link belong to a bonded link.

A digital subscriber loop (DSL) communication system that comprises a processing unit and a first set of DSL modems; wherein the first set of DSL modems are coupled over multiple lines to a second set of DSL modems; wherein the processing unit is configured to train at least one anchor DSL modem transmitter to transmit information over at least one anchor line at an anchor bit rate that is determined based on an allowable tolerable noise level and a minimum allowable signal-to-noise ratio (SNR) margin; and train one or more other DSL modem transmitter to transmit information over one or more other line at a bit rate that is determined based on a current noise level and a target SNR margin, wherein the target SNR margin is higher than the minimum allowable SNR margin; wherein after being trained at least one trained DSL modem transmitter of the first set of DSL modems is configured to transmit information to at least one trained DSL modem of the second set of DSL modems, wherein the at least one anchor link and the one or more other link belong to a bonded link.

A method for configuring a digital subscriber loop (DSL) communication system, the method includes: receiving a minimum bit rate (b_min) required for the operation of a line;

receiving a maximum level of crosstalk noise (N_max) that the line should be able to tolerate without service interruption; receiving a desired signal to noise ratio (SNR) margin (M_d); receiving a minimum SNR margin (M_min); receiving an intermediate SNR margin (M_int) that would allow the line to remain operational despite SNR reductions that are not related to crosstalk noise; measuring an attenuation of the line and estimating an equivalent working length (EWL) of the line; calculating, based on EWL and the attenuation three maximum bit rates, wherein the three maximum bit rates comprise a first maximum bit rate (b_full) that the line should support at Mint in the presence of N_max, a second maximum bit rate (b_int) that the line should support at Mint in a current noise environment, and a third maximum bit rate (b_d) that the line should support at M_d in a current noise environment; setting b_min and a target SNR margin (M_t) based on a fulfillment of the following conditions: if b_full <b_min then b_min is reduced so that b_full is greater than or equal to b_min; if b_d≥b_min then M_t is set to M_d; and if b_int≥b_min, then M_t is set to Mint; and training a DSL modem to exchange information at b_min and with a target SNR margin (M_t).

A digital subscriber loop (DSL) communication system that comprises a processing unit and a first DSL modem that is coupled over a line to a second DSL modem; wherein the processing unit is configured to receive a minimum bit rate (b_min) required for the operation of a line; receive a maximum level of crosstalk noise (N_max) that the line should be able to tolerate without service interruption; receiving a desired signal to noise ratio (SNR) margin (M_d); receive a minimum SNR margin (M_min); receive an intermediate SNR margin (Mint) that would allow the line to remain operational despite SNR reductions that are not related to crosstalk noise; measure an attenuation of the line; estimating an equivalent working length (EWL) of the line; calculate, based on EWL and the attenuation three maximum bit rates, wherein the three maximum bit rates comprise a first maximum bit rate (b_full) that the line should support at Mint in the presence of N_max, a second maximum bit rate (b_int) that the line should support at Mint in a current noise environment, and a third maximum bit rate (b_d) that the line should support at M_d in a current noise environment; and train a DSL modem to exchange information at b_min and with a target SNR margin (M_t), wherein b_min and M_t fulfill the following conditions: if b_full<b_min then b_min is reduced so that b_full is greater than or equal to b_min; if b_d≥b_min then M_t is set to M_d; and if b_int≥b_min, then M_t is set to Mint.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 8 illustrates some stages of the method of FIG. 7 according to an embodiment of the invention;

FIG. 9 illustrates some stages of the method of FIG. 7 according to an embodiment of the invention.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Various methods are provided for providing a robust DSL system. A desirable tradeoff between robustness and throughput can be obtained. A DSL modem may be trained to exchange information at an anchor bit rate (also referred to as a safe bit rate). The anchor bit rate is determined based on various parameters such as an allowable tolerable noise level. The allowable tolerable noise level is the noise level that can be tolerated by the receiver without the receiver's SNR margin dropping below the minimum SNR margin and causing a retraining of the line with corresponding service interruption on the line. It is noted that a "safe" bitloading map is also referred to as an anchor bitloading map.

It is noted that an exchange of information by a DSL modem may include transmitting information by a DSL modem transmitter, receiving information by a DSL modem receiver or a combination thereof.

The aforementioned embodiments of the invention and several of the embodiments described in the remainder of the specification apply to DSL lines that may be symmetrical or asymmetrical. A bit rate of a symmetrical DSL line is the bit rate that is used in both the upstream and downstream directions. An SNR margin of a symmetrical DSL line is the minimum of the SNR margins of the upstream and downstream receivers connected to the same line.

In an asymmetrical DSL line the bit rate and other information exchange parameters may be different in the upstream and downstream directions. Accordingly, the methods described below may be applied separately to the upstream and downstream directions. Thus, the selection of anchor lines in the upstream direction may differ from the selection of anchor lines in the downstream direction. The same applies to measurements of SNR, QLN, SNR margin, and the like.

DSL lines using the aforementioned SHDSL technology are typically symmetrical and use the same symbol rate and same constellation size (and therefore the same bit rate) in both the upstream and downstream directions. However, SHDSL lines may also be asymmetrical through the use of different symbol rates and/or different constellation sizes (and therefore different bit rates) between the upstream and downstream directions.

DSL lines using the aforementioned VDSL technology are typically asymmetrical and use different bit rates between the upstream and downstream directions. However, VDSL lines may also be symmetrical and use the same bit rate in both the upstream and downstream directions.

Figure 10:
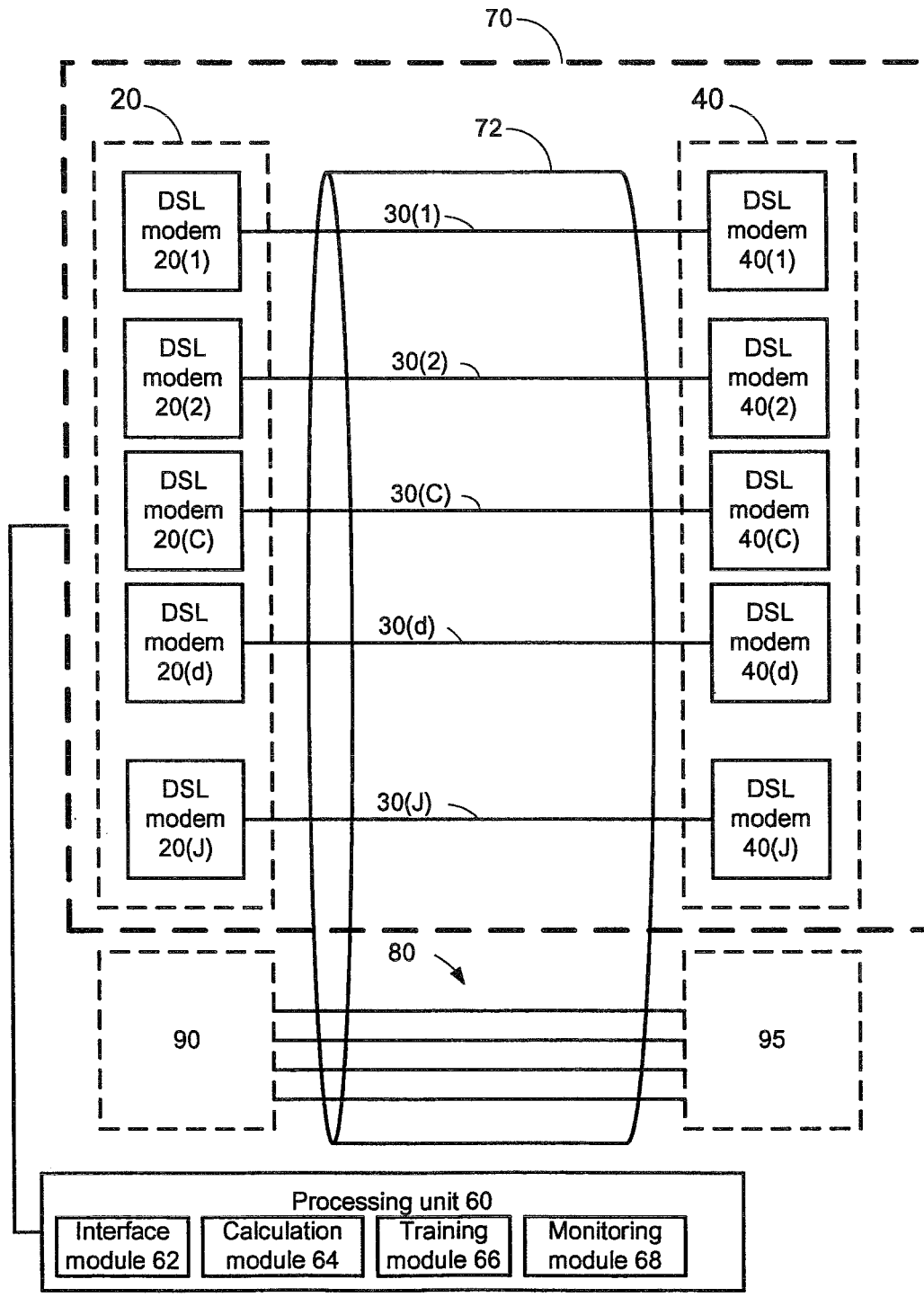
FIG. 10 is a block diagram illustrating a system topology according to embodiments of the present invention.

Referring to Fig. 10, a communication system 10 includes a first set 20 of DSL modem transceivers 20(1) to 20(J) that are connected over multiple respective lines (each line includes a pair of copper wires) 30(1) to 30(J) to a second set 40 of DSL modem transceivers 40(1) to 40(J), where index J is a positive integer. Each DSL modem transceiver includes a DSL modem transmitter and a DSL modem receiver. Transmission from first set 20 to second set 40 is referred to as downstream transmission, while transmission from second set 40 to first set 20 is referred to as upstream transmission. In the embodiment shown, lines 30(1) to 30(J) are included in bonded link 70, and the copper pairs 30(1)-30(J) are located inside cable binder 72. A sub-set of lines (30(1)-30(C)) may form a self-crosstalk cancellation group. It is noted that all lines 30(1)-30(J) and not just a subset thereof may belong to the same self-crosstalk cancellation group.

It is noted that the lines illustrated in Fig. 10 may be included in more than a single bonded link, that some lines may not be included in any bonded link and that alien crosstalk may exist between lines that do not belong to the self-crosstalk cancellation group.

Fig. 10 also illustrates other lines 80 that are also located inside cable binder 72 but do not belong to bonded link 70. These other lines are connected between DSL modems 90 and 95. These other lines can introduce alien crosstalk to the lines in bonded link 70.

For simplicity of explanation it is assumed that lines 30(1)-30(J) are symmetrical DSL lines but this is not necessarily so. For example, some or all of these lines may be asymmetrical DSL lines.

At least a subset of DSL modem transceivers 20(1) to 20(J) may be connected to a processing unit 60 that can assist in applying self crosstalk cancellation schemes. Additionally or alternatively, each DSL modem transceiver may have self crosstalk cancellation capabilities.

The first set 20 of DSL modem transceivers may be located in a central office (CO) location, and may possibly be included in a network terminal or in a Digital Subscriber Line Access Multiplexer (DSLAM). The second set 40 of DSL modem transceivers may be included in a remote terminal (RT), or may be included in a CPE unit at the customer premises.

Processing unit 60 may include one or more processors to assess and additionally or alternatively monitor one or more parameters of bonded link 70 or its sub-systems. These parameters may be, for example, data traffic conditions, signal-to-noise ratio (SNR) margin on each of one or more of the communication links, data rates on each of one or more of the communication links, or other performance parameters.

Processing unit 60 may also determine, monitor and/or control transmission characteristics for each of the communication links, including bit rate, symbol rate, constellation size, or power transmission level.

Processing unit 60 may include: (i) interface module 62 for receiving parameters from a user, a service provider, a system administrator and the like, (ii) calculation module 64 for calculating information exchange parameters and selecting anchor lines, (iii) training module 66 for training DSL modems to transmit according to the calculated information exchange parameters and selected anchor lines, and (iv) monitoring module 68 for monitoring the exchange of information and even for triggering a change of information exchange parameters (for example—selecting a new anchor DSL modem, changing bit rate and the like). Either one of modules 62, 64, 66 and 68 may include hardware components, software components or a combination thereof. For example, calculation module can be a logical module, an algorithm, a processor that executes an algorithm, but this is not necessarily so. Two or more modules can be integrated together, spaced apart from each other and the like. For example, a single hardware processor can execute both a training module code and a calculation module code.

It is noted that the term "train a line" means training DSL modems that are connected to the line. This may involve training an upstream (or downstream) DSL modem transmitter and a corresponding upstream (or downstream) DSL modem receiver.

The importance of robust DSL communication will be illustrated by the following example. It is assumed that a bonded link consists of two DSL lines (J=2), which are denoted as Line 1 and Line 2, with the self-crosstalk between these two lines being cancelled by one or more cancellation filter matrices. In the case where there are no other disturbers in the operating environment, both Line 1 and Line 2 enjoy significantly increased SNR from the application of self-crosstalk cancellation. If both lines convert this SNR margin increase to a corresponding increase in bit rate, they will become more susceptible to interruption of their operation by the addition of new services in their environment.

Accordingly, the addition of a single new DSL line in proximity to Lines 1 and 2 may reduce the SNR of both Line 1 and Line 2 enough to cause both of these lines to retrain, thereby resulting in a temporary interruption of the high-speed service delivered over the bonded link. This is typically unacceptable, since bonded links are typically used for the delivery of business-grade services, for which high service availability is very important and service interruptions are highly undesirable.

One solution to this problem is to convert only part of the SNR increase resulting from the self-crosstalk cancellation to increased bit rate on both Lines 1 and 2. For example, if the self-crosstalk cancellation results in an SNR increase of 20 dB, only 12 dB of that increased SNR may be utilized for increased bit rate. As a result, the bonded link would implement only about 60% of the maximum available bit rate increase, and would operate with an SNR margin that is increased by 8 dB. The term "SNR margin" is defined as the available additional SNR that is not being utilized to increase the bit rate of the corresponding modem. SNR margin is used to protect DSL lines from excessive retrains and service interruptions caused by changes in the noise environment or in the signal power.

DSL lines are typically operated with SNR margins in the range of 6-9 dB (denoted as "target SNR margin"), and they typically retrain when their SNR margin drops below a value specified by the network operator, typically 1-3 dB (denoted as "minimum SNR margin").

If, for example, Lines 1 and 2 could each operate at 5 Mbps with 6 dB SNR margin in the absence of self-crosstalk cancellation, then with a 20 dB SNR increase resulting from self-crosstalk cancellation, Lines 1 and 2 could operate at 5 Mbps each with 26 dB SNR margin, or at 11 Mbps each with 6 dB SNR margin, or at any intermediate level of bit rate and SNR margin, for example at 8.5 Mbps each with 14 dB SNR margin.

In the latter case, if the minimum SNR margin is set at 1 dB for both Lines 1 and 2, and if enough new disturbers were added to the operating environment to increase the noise floor by more than 13 dB, then both Lines 1 and 2 would be forced to retrain, resulting in an undesirable interruption of service for the corresponding bonded link. In other words, even though the total bit rate of the bonded link was only increased from 10 Mbps to 17 Mbps (instead of the possible maximum of 22 Mbps), the service delivered over this bonded link may still be disrupted with a 13 dB increase in the noise power in the operating environment.

A different approach is to make use of the "cut-line protection" feature found in some bonded DSL equipment. Cut-line protection refers to the ability of the equipment to continue to deliver service over a bonded link even when some of the lines in the bonded link are "cut", e.g., become unavailable. Of course, during this period of unavailability, the service is delivered at a reduced bit rate. However, a temporary reduction in bit rate may typically be more acceptable for business-grade services than a temporary complete service interruption.

Therefore, a more desirable solution to the mentioned above example may be not to treat both lines the same, but instead utilize one line for maximum performance and the other for maximum robustness.

In particular, if Line 1 operates at 11 Mbps bit rate with 6 dB SNR margin and Line 2 operates at 7 Mbps with 20 dB SNR margin, then the bonded link will be increased to 18 Mbps and yet the link will remain operational even if enough additional disturbers are added to the operating environment to increase the noise floor by 19 dB.

By comparing this solution with the previous one of running both lines at 8.5 Mbps with 14 dB SNR margin, it can be seen that the total bit rate of the link was increased from 17 Mbps to 18 Mbps, and yet the link's robustness to additional noise was increased from 13 dB to 19 dB.

Accordingly, even with the increased link bit rate, it would take four times as many additional disturbers to cause a service interruption of the bonded link.

The benefits of this approach become more evident as the number of lines in the bonded link increases. In the above example, if the number of lines of the bonded link is increased from 2 to 4, then with the first solution the bonded link operates at 34 Mbps and can be interrupted with a noise increase of more than 13 dB, while with the desired solution the bonded link bit rate increases to 40 Mbps and yet the link can tolerate a noise increase of up to 19 dB before suffering a complete service interruption.

Bonded Copper Links with Self-Crosstalk Cancellation

An embodiment of the present invention is partially illustrated by the above example and involves using some lines in a bonded link as "anchors" of the bonded link for robustness to added noise, while allowing the remaining lines to reap the full benefits of crosstalk cancellation. Anchor lines are connected to anchor DSL modems that operate at an anchor bit rate that is lower then the bit rate of so-called non-anchor DSL modems that are connected to non-anchor lines of the bonded link.

Figure 1:
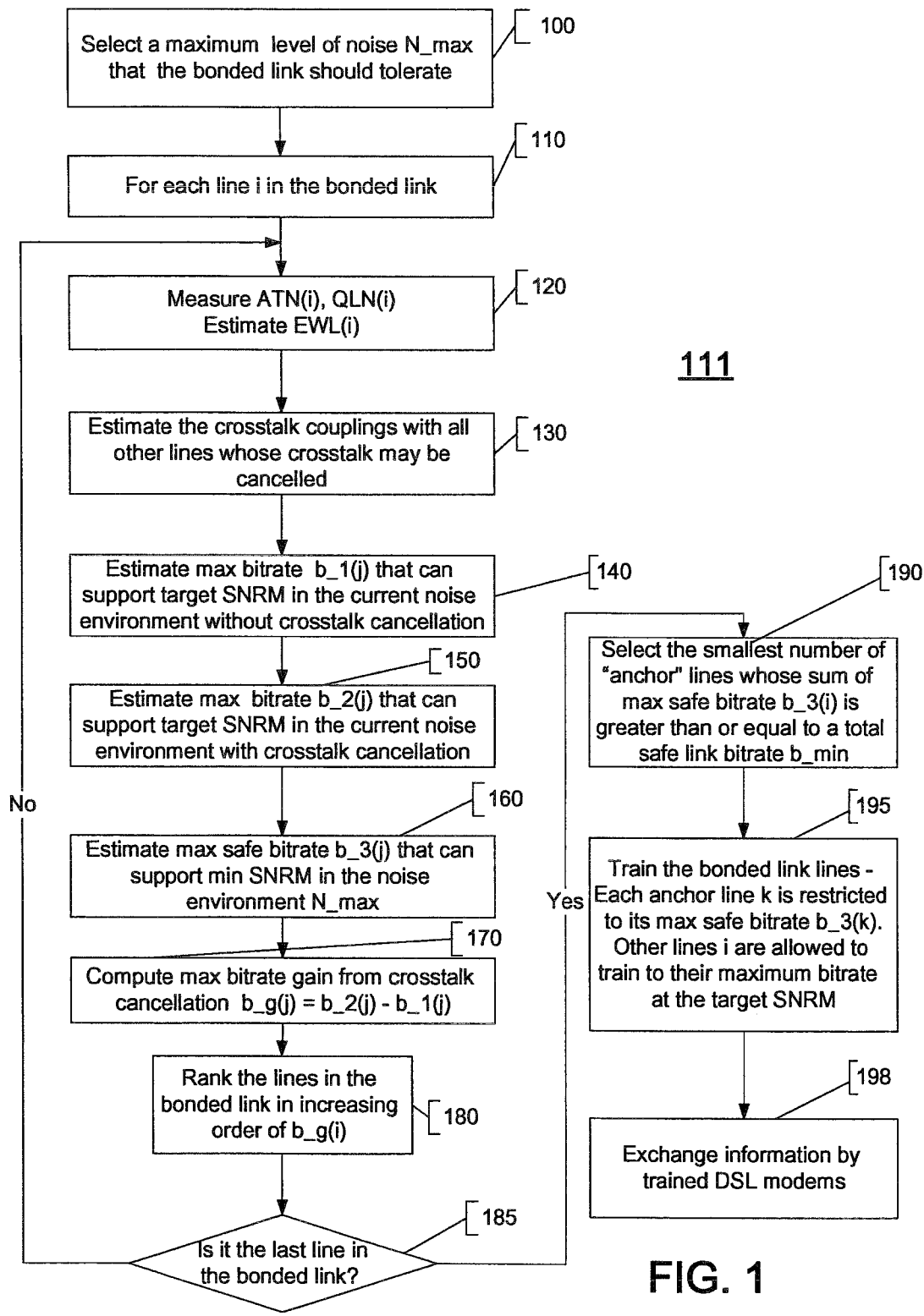
FIG. 1 illustrates a method according to an embodiment of the invention.

FIG. 1 illustrates method 111 according to an embodiment of the invention. Method 111 starts by stage 100 of selecting a maximum level of crosstalk noise (N_max) that the bonded link should be able to tolerate without service interruption, and the minimum bit rate b_min at which the bonded link needs to operate.

Stage 100 is followed by performing, for each line of the bonded link, an iteration of stages 120, 130, 140, 150, 160, 170 and 180. The number of iterations is controlled by control stage 110 (denoted "for each line") and control stage 185 (denoted "is it the last line in the bonded link?"). If the bonded link includes J lines then this sequence is repeated J times.

Stage 120 includes measuring, for each line in the bonded link, the attenuation (ATN) of the line and the quiet line noise (QLN) on the line, and estimating, for each line, the equivalent working length (EWL) of the loop that includes the line.

Stage 130 includes estimating, for each line in the bonded link, the crosstalk coupling functions between this line and all other lines whose self-crosstalk can be cancelled.

Stage 140 includes estimating, for each line (denoted j), based on the estimated EWL and measured ATN and QLN of the line, a first maximum bit rate b__1(j) that line j can support at the target SNR margin in its current noise environment without self-crosstalk cancellation.

Stage 150 includes estimating, for each line (denoted j), based on the estimated EWL and measured ATN and QLN of the line, a second maximum bit rate b__2(j) that line j can support at the target SNR margin in its current noise environment with self-crosstalk cancellation.

Stage 160 includes estimating, for each line (denoted j), based on the estimated EWL and measured ATN and QLN of the line a maximum "safe" bit rate (also referred to as an anchor bit rate) b__3(j) that line j can support at the minimum SNR margin in a noise environment with crosstalk noise N_max.

Stage 170 includes computing, for each line (denoted j), an estimate of its maximum bit rate gain from self-crosstalk cancellation b_g(j), wherein b_g(j) =b__2(j)-b__1(j).

Stage 180 includes ranking the lines of the bonded link in increasing order of b_g(j) values.

After the iterations of stages 120 to 180 are completed, method 111 proceeds to stage 190 of selecting the smallest number of "anchor" lines whose corresponding "safe" bit rates b__3(j) add up to a total "safe" link bit rate that is greater than or equal to b_min. The selecting may start with the with the first line according to the rank provided during stage 180, e.g., with the line i that has the lowest bit rate gain b_g(i) from self-crosstalk cancellation.

Stage 190 is followed by stage 195 of training the lines in the bonded copper link so that: (i) each anchor DSL modem k (connected to anchor line k) is restricted to its corresponding maximum "safe" bit rate b__3(k); and (ii) each other non-anchor DSL modem m (connected to non-anchor line m) is allowed to train to the maximum bit rate it can achieve at the target SNR margin.

Stage 195 is followed by stage 198 of exchanging information by trained DSL modems. Information may include data, audio, video, control signals and a combination thereof. The information may be exchanged over symmetrical DSL links or asymmetrical DSL links.

It is noted that stages 100 to 195 can be repeated many times, even after the modems starts to exchange information. The repetition may be triggered by events such as deployment of new lines, changes in ambient conditions, based on a predetermined repetition scheme, and the like.

The outcome of method 111 may provide a desired tradeoff between robustness and throughput. A bonded link can be utilized at a maximum bit rate with self-crosstalk cancellation while still achieving the objective of maintaining the minimum bit rate b_min even in the presence of maximum crosstalk noise N_max.

According to various embodiments of the invention various combinations of method 111 are provided and according to yet additional embodiments of the invention various stages of method 111 may be modified. Some non-limiting examples of stage modifications and stage combinations are illustrated in the following paragraphs.

The maximum level of crosstalk noise N_max in stage 100 may be replaced by the maximum number of disturbers d_max that may be deployed on the neighboring lines of the bonded link, and the corresponding maximum level of crosstalk noise may be estimated using industry-standard crosstalk models, often referred to as Unger models.

The maximum level of crosstalk noise N_max and, additionally or alternatively, the minimum bit rate b_min specified in stage 100 may be automatically inferred from a more qualitative user input, such as a user choice among performance/robustness tradeoff levels ranging from "maximum performance" to "maximum robustness".

Stage 120 may not include measuring the quiet line noise (QLN).

A combination of stages of method 111 may not include any one or more of stages 150, 160 and 170.

Stage 180 may be omitted, in which case, stage 190 may include selecting lines as anchor lines in an arbitrary manner or in any other manner that is not dependent on b_g(j).

Stage 180 may include ranking the lines in order of increasing b_1(j) or in order of increasing b_2(j).

Figure 2:
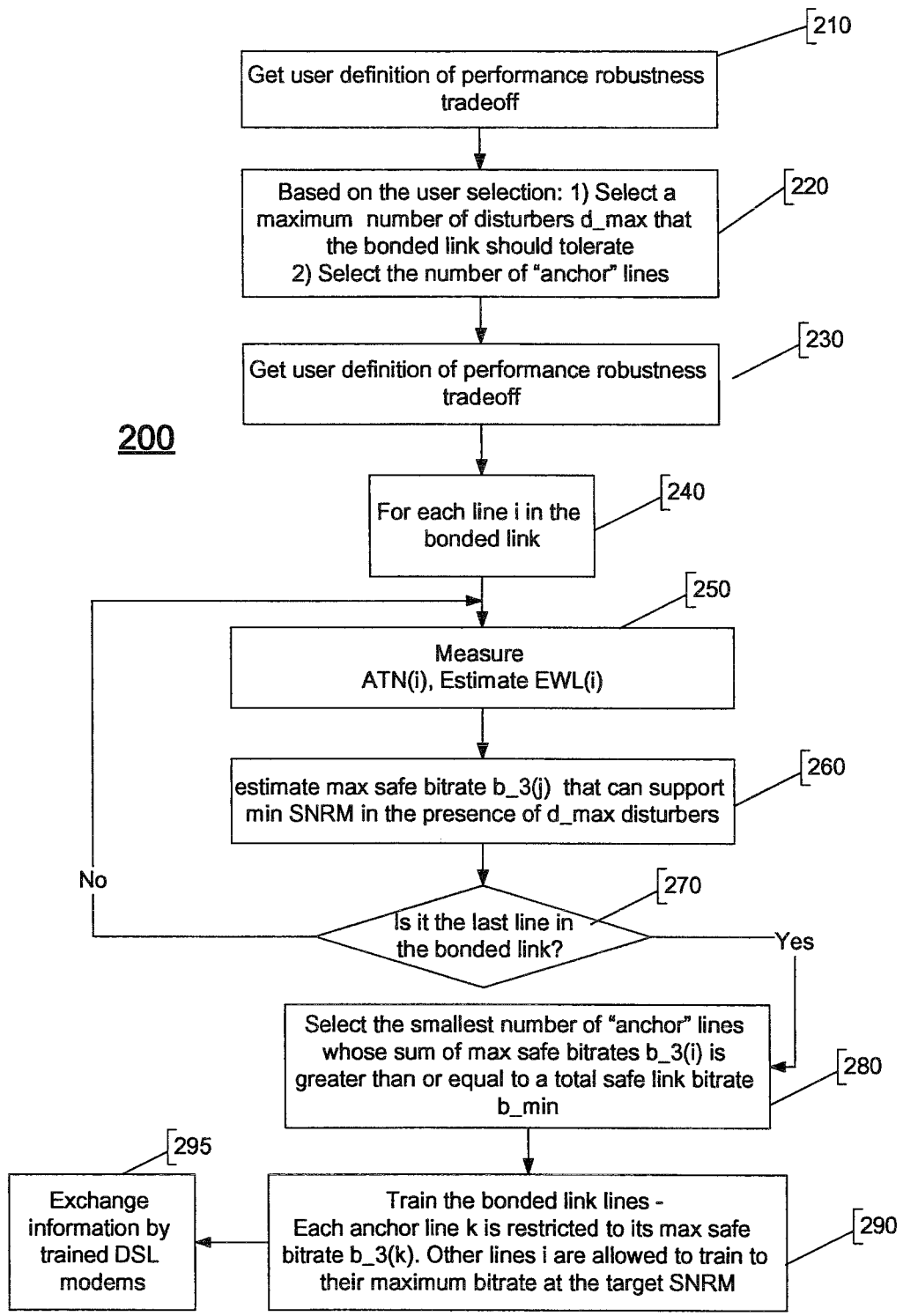
FIG. 2 illustrates a method according to an embodiment of the invention.

FIG. 2 illustrates method 200 according to an embodiment of the invention. Method 200 starts by stage 210 of accepting a user selection among performance/robustness tradeoff levels. These levels may range from "maximum performance" to "maximum robustness".

Stage 210 is followed by stage 220 of selecting, based on the accepted user selection, the maximum number of disturbers d_max that the bonded link should be able to tolerate without service interruption and the number of "anchor" lines n_anc.

Stage 220 is followed by performing, for each line of the bonded link, an iteration of stages 250 and 260. The number of iterations is controlled by control stage 240 (denoted "for each line") and control stage 270 (denoted "is it the last line in the bonded link?"). If the bonded link includes J lines the sequence is repeated J times.

Stage 250 includes measuring, for each line, the attenuation (ATN) of the line and the quiet line noise (QLN) on the line, and estimating, for each line, the equivalent working length (EWL) of the loop.

Stage 260 includes estimating, for each line, the maximum "safe" bit rate b_3(j) that line j can support at the minimum SNR margin in the presence of d_max disturbers, based on the estimated EWL and measured ATN of the line.

After the iterations of stages 250 and 260 are completed method 200 proceeds to stage 280 of selecting the n_anc "anchor" lines arbitrarily among the lines of the bonded link.

Stage 280 is followed by stage 290 of training the DSL modems in the bonded link so that: (i) each anchor DSL modem k (connected to anchor line k) is restricted to its corresponding maximum "safe" bit rate b_3(k); (ii) each other non-anchor modem m (connected to non-anchor line m) is allowed to train to the maximum bit rate it can achieve at the target SNR margin.

Stage 290 is followed by stage 295 of exchanging information by trained DSL modems.

Safe Reduction of Noise Protection in Bonded Links

In another embodiment of the present invention, the maximum crosstalk noise that each line is supposed to tolerate can be selected based on the crosstalk couplings between the lines whose self-crosstalk can be cancelled.

This embodiment takes into consideration the differences in the crosstalk couplings between different copper pairs. The crosstalk couplings may vary significantly in strength, depending on the physical characteristics of the pairs (such as wire gauge, pair twist, and wire insulation) and their physical proximity to each other inside the cable.

Accordingly, each copper pair may have strong crosstalk couplings to just a few of its neighboring pairs, moderate crosstalk couplings to a few more of its neighboring pairs, and weak crosstalk couplings to many more of the pairs in the binder. Industry standards bodies have generated statistical models of crosstalk couplings that quantify this distribution of crosstalk coupling strength.

It is noted that when a group of DSL lines utilizes self-crosstalk cancellation, the crosstalk couplings between these lines are typically estimated quite accurately. Therefore, for each line in this group, it is possible to estimate how many of its strongly, moderately and weakly coupled neighboring lines belong to the same group. Since the crosstalk from all those lines can be cancelled, the robustness of this line need only be considered with respect to other lines that do not belong to the same group of lines. As a result, the level of additional crosstalk that each of these lines needs to be able to tolerate may be reduced.

The following example illustrates the above mentioned concept: it is assumed that a bonded link includes 25 pairs of lines and that out of these 25 pairs of lines, 20 pairs of lines can benefit from the same self crosstalk cancellation scheme. The 5 other lines can introduce alien cross-talk.

These 20 pairs include two DSL lines that are referred to as Line 1 and Line 2. The crosstalk couplings between these 20 lines are estimated accurately. Line 1 has 4 strong couplings, 7 moderate couplings, and 8 weak couplings with the other 19 lines in the group, while Line 2 has 2 strong couplings, 4 moderate couplings, and 13 weak couplings with the other 19 lines in the group. Assuming that each of Line 1 and Line 2 can be exposed to substantially the same number (for example 5) of strong couplings, then Line 1 can be exposed to only one additional strongly coupled line that may inject alien crosstalk while Line 2 may be exposed to as many as three additional strongly coupled lines that may inject alien crosstalk. Accordingly, Line 2 may be more exposed than Line 1 to additional strong crosstalk from new disturbers that may be deployed in the same cable. As a result, if Line 2 is selected as an "anchor" line, it will have to be protected against a higher maximum crosstalk level than Line 1. Therefore, selecting Line 1 as an "anchor" line instead of Line 2 may result in a higher total link bit rate while still achieving the objective of maintaining the minimum bit rate b_min even in the event of a high number of additional disturbers being deployed in the same cable.

Figure 3:
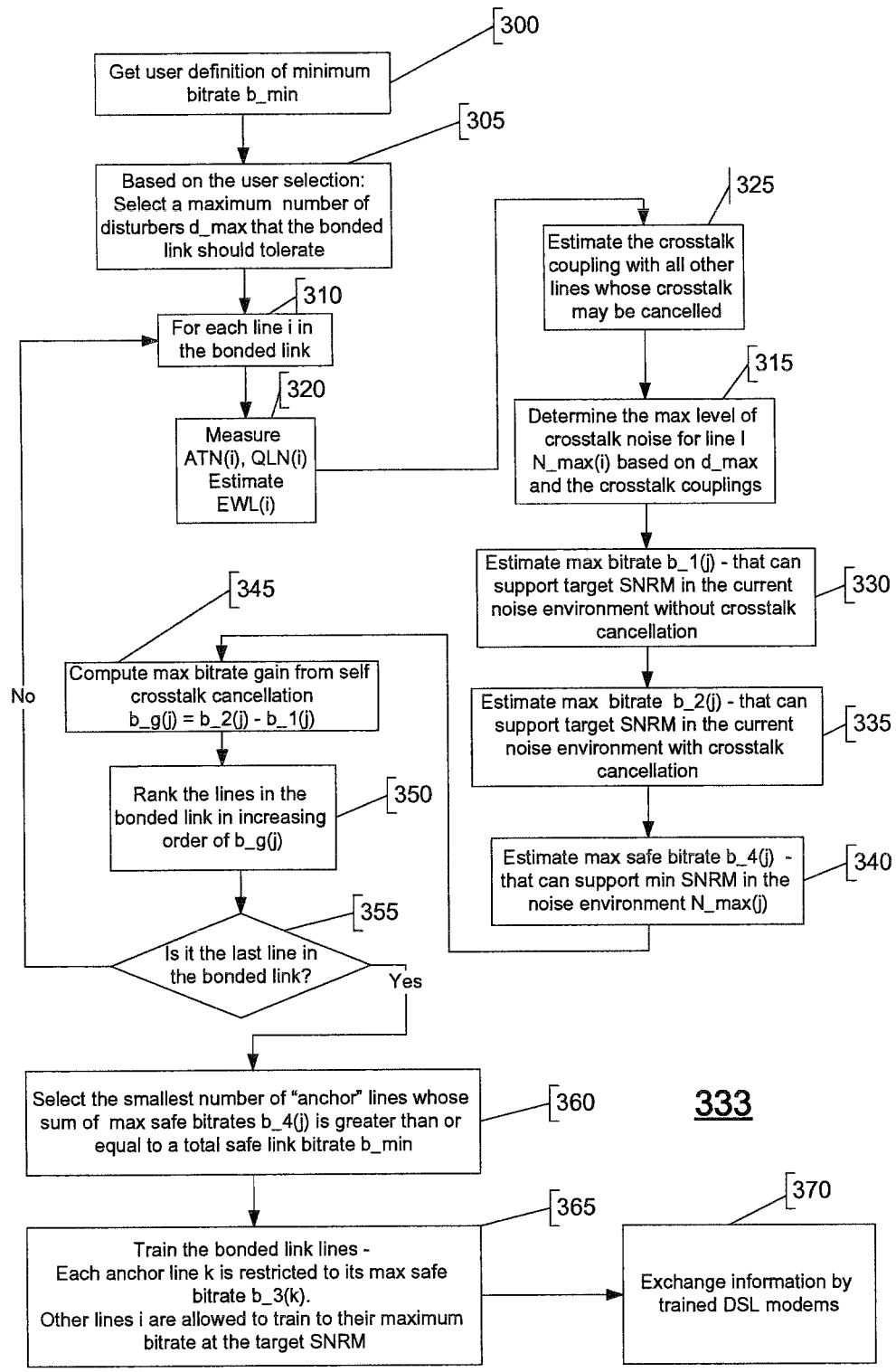
FIG. 3 illustrates a method according to an embodiment of the invention.

FIG. 3 illustrates method 333 according to an embodiment of the invention.

Method 333 starts by stage 300 of receiving a minimum bit rate b_min at which the bonded link needs to operate. The user, administrator, or system operator may provide b_min.

Stage 300 is followed by stage 305 of selecting a maximum number of additional disturbers d_max that the bonded link should be able to tolerate without service interruption.

It is noted that method 300 may include receiving from the user, administrator, or system operator both b_min and d_max.

Stage 310 is followed by performing, for each line of the bonded link, an iteration of stages 315, 320, 325, 330, 335, 340, 345 and 350. The number of iterations is controlled by control stage 310 (denoted "for each line") and control stage 355 (denoted "is it the last line in the bonded link?"). If the bonded link includes J lines then this sequence is repeated J times.

Stage 320 includes measuring for each line (denoted j) the attenuation (ATN) of the line and the quiet line noise (QLN) on the line, and estimating, for each line, the equivalent working length (EWL) of the loop.

Stage 320 is followed by stage 325 of estimating, for each line (denoted j) in the bonded link, the crosstalk coupling functions between this line and all other lines whose self-crosstalk can be cancelled.

Stage 325 is followed by stage 315 of determining, for each line (denoted j) of the bonded link, the maximum level of crosstalk noise N_max(j) that line j should be able to tolerate based on the crosstalk couplings between all the lines whose self-crosstalk can be cancelled and the maximum number of additional disturbers d_max.

Stage 315 is followed by stage 330 of estimating, for each line (denoted j) of the bonded link, based on the estimated EWL and measured ATN and QLN of the line, a first maximum bit rate b__1(j) that the line can support at the target SNR margin in its current noise environment without self-crosstalk cancellation.

Stage 330 is followed by stage 335 of estimating, for each line (denoted j) of the bonded link, based on the estimated EWL and measured ATN and QLN of the line, a second maximum bit rate b__2(j) that the line can support at the target SNR margin in its current noise environment with self-crosstalk cancellation.

Stage 335 is followed by stage 340 includes estimating, for each line (denoted j) of the bonded link, based on the estimated EWL and measured ATN and QLN of the line, a "safe" maximum bit rate b__4(j) that the line can support at the minimum SNR margin in a noise environment with crosstalk noise N_max(j).

Stage 340 is followed by stage 345 of computing, for each line (denoted j) an estimate of its maximum bit rate gain from self-crosstalk cancellation b_g(j), wherein b_g(j) =b__2(j)-b__1(j).

Stage 345 is followed by stage 350 of ranking the lines in the bonded link in increasing order of b_g(j).

After the iterations of stages 315-350 are completed method 333 proceeds to stage 360.

Stage 360 includes selecting the smallest number of "anchor" lines whose corresponding "safe" bit rates b__4(j) add up to a total "safe" link bit rate that is greater than or equal to b_min. The selecting may start with the first line according to the rank provided during stage 350, e.g., with the line i that has the lowest bit rate gain b_g(i) from self-crosstalk cancellation.

Stage 360 is followed by stage 365 of training the DSL modems that are connected to the bonded copper link so that: (i) each anchor DSL modem k (being connected to anchor line k) is restricted to its corresponding maximum "safe" bit rate b__4(k); and (ii) each other non-anchor DSL modem m (connected to non-anchor line m) is allowed to train to the maximum bit rate it can achieve at the target SNR margin.

Stage 365 is followed by stage 370 of exchanging information by trained DSL modems.

Method 333 may allow the bonded link to maximize its total bit rate with self-crosstalk cancellation while still achieving the objective of maintaining the minimum bit rate b_min even in the presence of additional disturbers d_max.

According to various embodiments of the invention various combinations of method 333 are provided and according to yet additional embodiments of the invention various stages of method 333 may be modified. Some non-limiting examples of stage modifications and stage combinations are illustrated below:

The maximum number of disturbers d_max may be replaced by the maximum level of crosstalk noise N_max.

The maximum number f disturbers d_max and, additionally or alternatively, the minimum bit rate b_min may be automatically inferred from a more qualitative user input, such as a user choice among performance/robustness tradeoff levels ranging from "maximum performance" to "maximum robustness".

Stage 320 may not include measuring the quiet line noise (QLN).

A combination of stages of method 333 may not include either one of stages 330, 335 and 340.

Stage 350 may be omitted and stage 360 may include selecting lines as anchor lines in an arbitrary manner.

Stage 360 may include ranking the lines in order of increasing b__1(j) or in order of increasing b__2(j).

Single-Pair Copper Links with Self-Crosstalk Cancellation

The embodiments of the present invention described thus far referred to bonded links with crosstalk cancellation. However, the same concept may be applied to bonded links that utilize only one copper pair, both in the presence and in the absence of crosstalk cancellation.

For example, VDSL2 equipment may utilize Self-FEXT Cancellation among multiple single-pair links deployed to different customer locations. In this case, the concern is what will happen to these VDSL2 lines when new DSL services are deployed in the same cable from different DSL equipment, so that the crosstalk they generate may not be cancelled.

Figure 4:
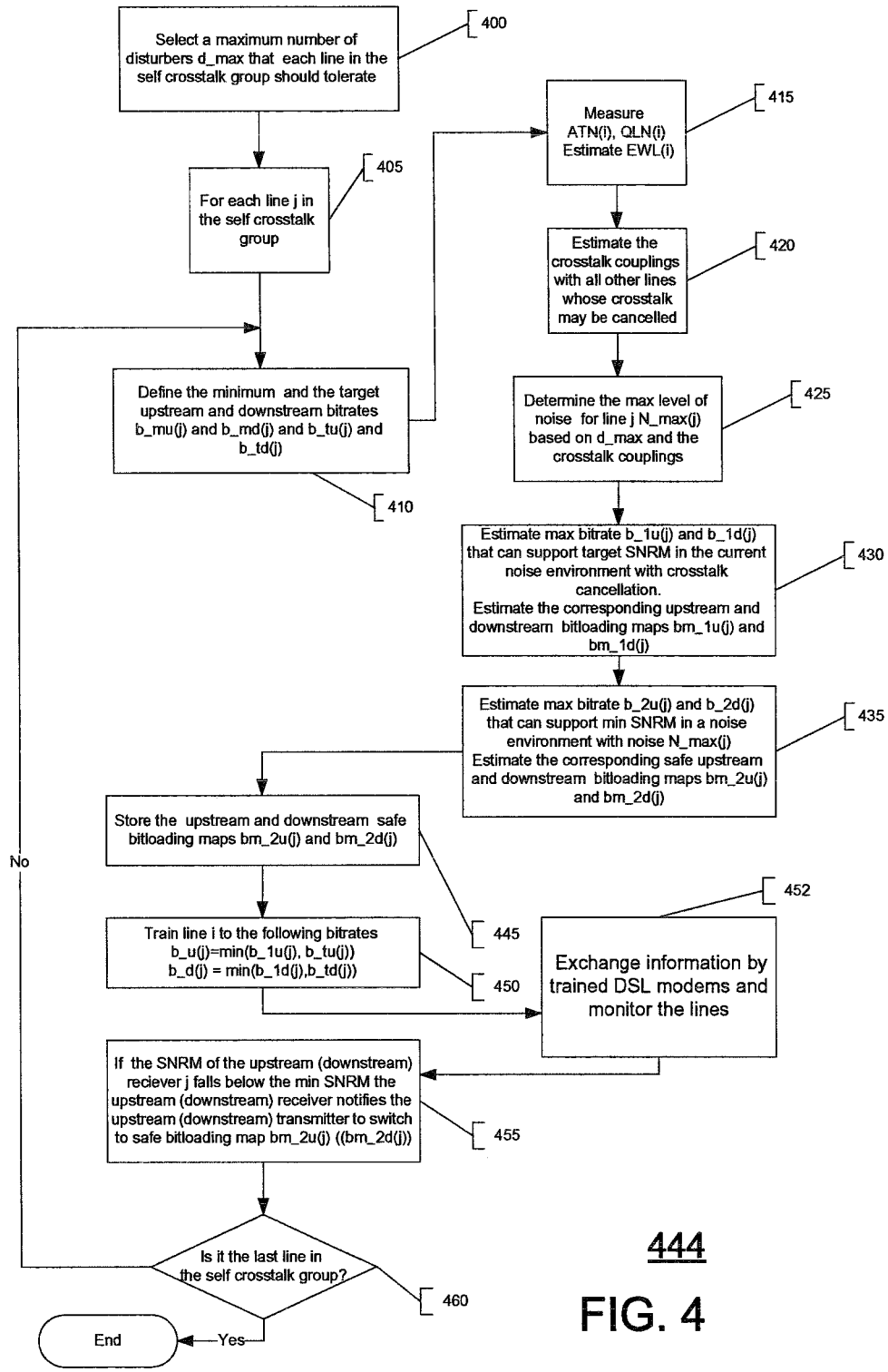
FIG. 4 illustrates a method according to an embodiment of the invention.

FIG. 4 illustrates method 444 according to an embodiment of the invention. Method 444 starts by stage 400 of selecting a maximum number of additional disturbers d_max that each of the lines in the self-FEXT group should be able to tolerate without service interruption.

Stage 400 is followed by performing, for each line in a group of lines whose self-FEXT can be canceled (referred to as a self-FEXT group), an iteration of stages 410, 415, 420, 425, 430, 435, 445, 450 and 455. The number of iterations is controlled by control stage 405 (denoted "for each line") and control stage 460 (denoted "is it the last line in the self-FEXT group?"). If the self-FEXT group includes C lines then this sequence is repeated C times.

Stage 410 includes defining, for each line (denoted j) in the self-FEXT group, a minimum upstream bit rate b_mu(j) and a minimum downstream bit rate b_md(j) at which the line j needs to operate, and a target upstream bit rate b_tu(j) and a target downstream bit rate b_td(j) at which the line is desired to operate.

Stage 410 is followed by stage 415 of measuring, for each line, the attenuation (ATN) of the line and the quiet line noise (QLN) on the line, and estimating, for each line, the equivalent working length (EWL) of the line.

Stage 415 is followed by stage 420 of estimating, for each line (denoted j) in the self-FEXT group, the crosstalk coupling functions between this line and all other lines in the self-FEXT group whose self-crosstalk may be cancelled.

Stage 420 is followed by stage 425 of estimating, for each line (denoted j) in the self-FEXT group, the maximum level of crosstalk noise N_max(j) that line j should be able to tolerate, based on the crosstalk couplings between the lines in the self-FEXT group and the maximum number of additional disturbers d_max.

Stage 425 is followed by stage 430 of estimating, for each line (denoted j) in the self-FEXT group and based on the estimated EWL and measured ATN and QLN of the line, a first maximum upstream and a first maximum downstream bit rates b__1u(j) and b__1d(j) that the line can support at the target SNR margin in its current noise environment with self-crosstalk cancellation, and the corresponding upstream and downstream bitloading maps bm__1u(j) and bm__1d(j).

Stage 430 is followed by stage 435 of estimating, for each line (denoted j) in the self-FEXT group and based on the estimated EWL and measured ATN and QLN of the line, a second maximum upstream bit rate b__2u(j) and a second maximum downstream bit rate b__2d(j) that the line can support at the minimum SNR margin in a noise environment with crosstalk noise N_max(j), and a corresponding second (so-called "safe") upstream bitloading map bm__2u(j) and a second downstream bitloading map bm__2d(j).

Stage 435 is followed by stage 445 of storing bitloading maps bm__2u(j) and bm__2d(j) in both the upstream and downstream transceivers of each line (denoted j).

Stage 440 is followed by stage 450 of training the VDSL transceivers that are connected to line j to the upstream bit rate b_u(j) and downstream bit rates b_d(j), wherein b_u(j)=min (b__1u(j), b_tu(j)) and b_d(j)=min(b__1d(j),b_td(j)).

Stage 450 is followed by stage 452 of exchanging information by trained VDSL modems and monitoring the lines. The monitoring includes checking if the SNR margin of the upstream (downstream) receiver on line j falls below the minimum SNR margin. If the answer is positive then stage 452 is followed by stage 455 of an upstream (downstream) receiver notifying the corresponding upstream (downstream) to switch to the "safe" bitloading map bm__2u(j) ((bm__2d (j)).

In other words, if the SNR margin of a VDSL modem falls below a minimum SNR margin, then the VDSL modem switches to operating in a "safe" mode using precomputed "safe" bitloading maps, so that its SNR margin is increased to be at or above the minimum SNR margin.

Method 444 guarantees that each line j will be able to support its upstream and downstream bit rates b_u(j) and b_d(j) even in the presence of additional disturbers d_max.

Figure 5:
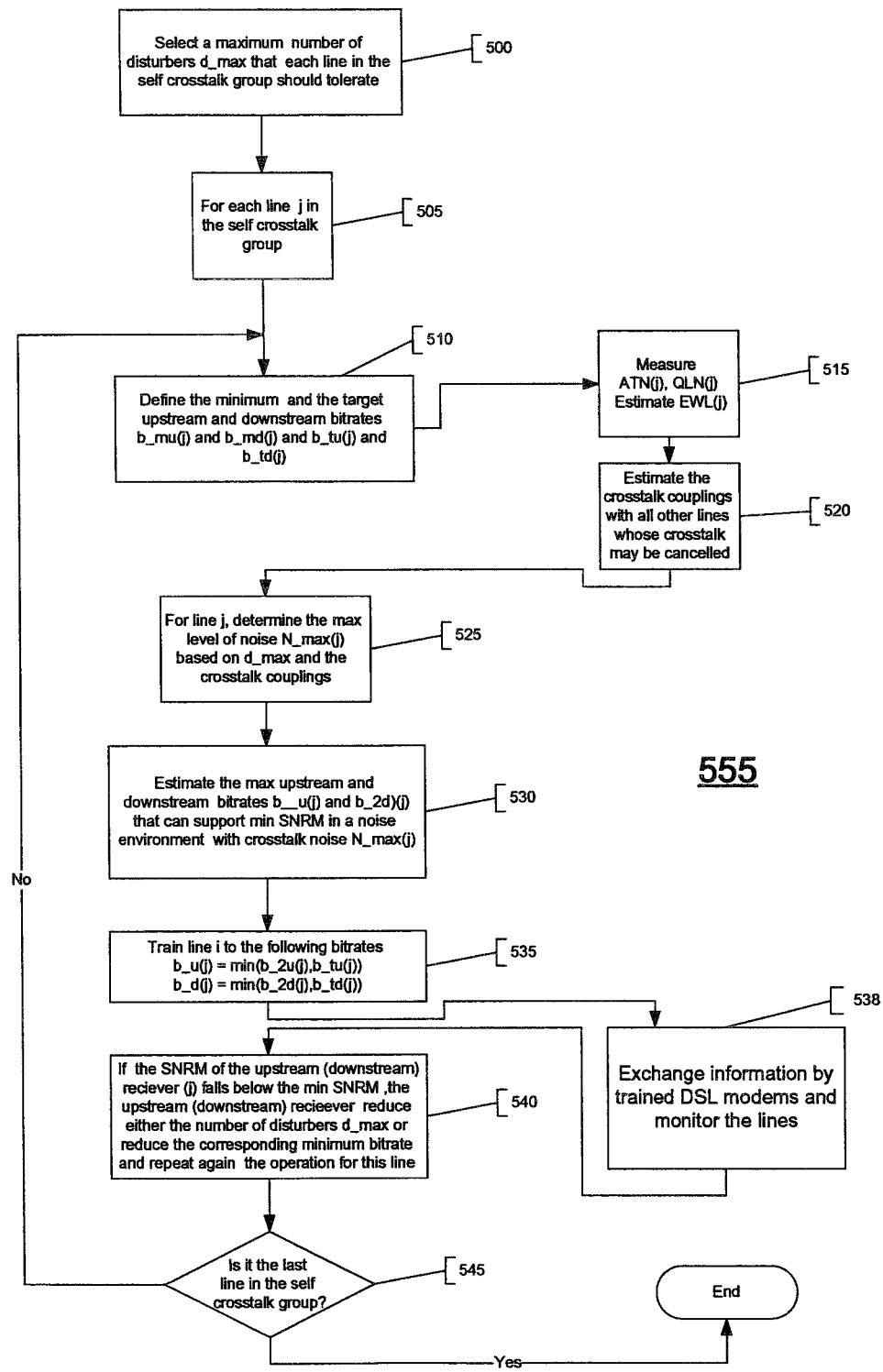
FIG. 5 illustrates a method according to an embodiment of the invention.

FIG. 5 illustrates method 555 according to an embodiment of the invention.

Method 555 starts by stage 500 of selecting a maximum number of additional disturbers d_max that each of the lines in the self-FEXT group should be able to withstand without service interruption.

Stage 500 is followed by performing, for each line of the self-FEXT group, an iteration of stages 510, 515, 520, 525, 530, 535 and 540. The number of iterations is controlled by control stage 505 (denoted "for each line") and control stage 545 (denoted "is it the last line in the bonded link?"). If there are C lines in the self-FEXT group then this sequence is repeated C times.

Stage 510 includes defining, for each line (denoted j) in the self-FEXT group, the minimum upstream bit rate b_mu(j) and a minimum downstream bit rate b_md(j) at which the line j needs to operate, and a target upstream bit rate b_tu(j) and a target downstream bit rate b_td(j) at which the line is desired to operate.

Stage 510 is followed by stage 515 of measuring, for each line, the attenuation (ATN) of the line, measuring the quiet line noise (QLN) on the line, and estimating the equivalent working length (EWL) of the line.

Stage 515 is followed by stage 520 of estimating, for each line (denoted j) in the self-FEXT group, the crosstalk coupling functions between this line and all other lines in the self-FEXT group whose self-crosstalk may be cancelled.

Stage 520 is followed by stage 525 of estimating, for each line (denoted j) in the self-FEXT group, the maximum level of crosstalk noise N_max(j) that line j should be able to tolerate, based on the crosstalk couplings between the lines in the self-FEXT group and the maximum number of additional disturbers d_max.

Stage 525 is followed by stage 530 of estimating, for each line (denoted j) in the self-FEXT group and based on the estimated EWL and measured ATN and QLN of the line, a first maximum upstream and a first downstream bit rates b__2u(j) and b__2d(j) that the line can support at the minimum SNR margin in a noise environment with crosstalk noise N_max(j).

Stage 530 is followed by stage 535 of training the VDSL transceivers that are connected to line j to the following upstream and downstream bit rates b_u(j) and b_d(j): b_u(j) =min(b__2u(j),b_tu(j)) and b_d(j)=min(b__2d(j),b_td(j)).

Stage 535 is followed by stage 538 of exchanging information by trained VDSL modems and monitoring the lines. The monitoring includes checking if the SNR margin of the upstream (downstream) receiver on line j falls below the minimum SNR margin. If the answer is positive then stage 538 is followed by stage 540, in which either the maximum number of disturbers d_max is reduced, or the corresponding minimum bit rate of the line is reduced, and the method continues to stage 545.

Method 500 guarantees that each line j will be able to support its upstream and downstream bit rates b_u(j) and b_d(j) even in the presence of additional disturbers d_max.

Copper Links without Crosstalk Reduction

Yet another embodiment of the present invention can be applied to DSL links without crosstalk cancellation. In particular, the method mentioned below can be applied to a DSL line that does not utilize any type of crosstalk reduction method. It is assumed that a DSL line should be deployed at a minimum bit rate b_min. Typically, a target SNR margin M_t would be set to a value that would allow this line to remain operational by maintaining an SNR margin at least as high as a minimum SNR margin M_min despite potential increases in crosstalk due to the deployment of additional disturbers and despite potential reductions in SNR due to increased loop attenuation or other impairments.

Figure 6:
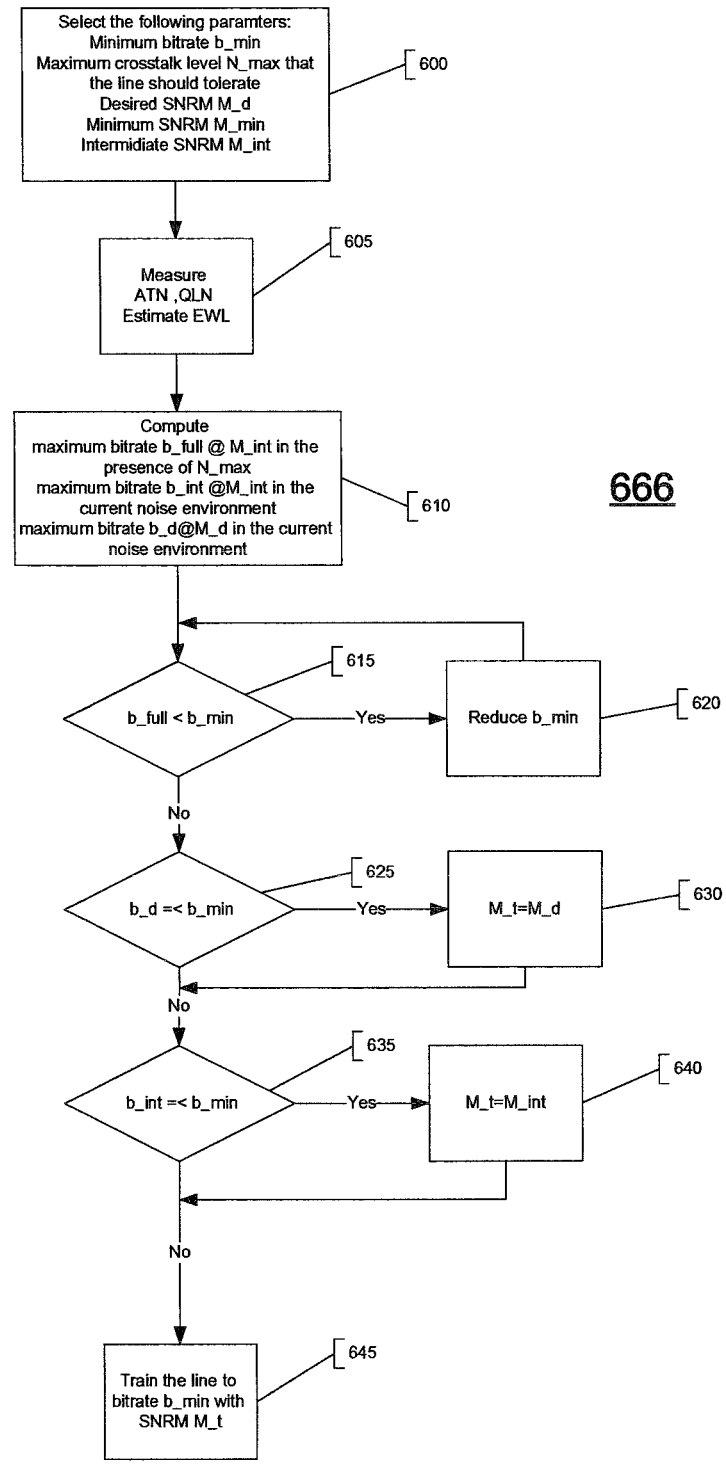
FIG. 6 illustrates a method according to an embodiment of the invention.

FIG. 6 illustrates method 666 according to an embodiment of the invention. Method 666 starts by stage 600 of selecting the following parameters: (i) a minimum bit rate b_min needed for the operation of the line; (ii) a maximum level of crosstalk noise N_max that the line should be able to tolerate without service interruption; (iii) a minimum SNR margin M_min; (iv) a desired SNR margin M_d that would allow the line to remain operational despite SNR reductions due to increased loop attenuation, deployment of additional disturbers, or other impairments, said desired SNR margin M_d being higher than the minimum SNR margin M_min; and (v) an intermediate SNR margin M_int that would allow the line to remain operational despite SNR reductions due to increased loop attenuation or other impairments, said other impairments not including potential increases in crosstalk due to the deployment of additional disturbers.

Since the SNR margin M_int does not account for potential increases in crosstalk due to the deployment of additional disturbers, it is lower than the desired SNR margin M_d and higher than the minimum SNR margin M_min: M_min<Mint<M_d.

Stage 600 is followed by stage 605 of measuring the attenuation (ATN) of the line, measuring the quiet line noise (QLN) on the line, and estimating the equivalent working length (EWL) of the loop.

Stage 605 is followed by stage 610 of computing the following bit rates using the estimated EWL and measured ATN and QLN: (i) the maximum bit rate b_full that the line can support on this loop at the intermediate SNR margin M_int in the presence of maximum crosstalk noise N_max; and (ii) the maximum bit rate b_d that the line can support on this loop at the desired SNR margin M_d in its current noise environment.

Stage 610 is followed by stages 615, 620, 625, 630, and 640 that guarantee that the selected actual target SNR margin M_t for the line fulfills the following conditions: (i) If b_full<b_min, then reduce b_min and repeat; (ii) If b_d≥b_min, then M_t=M_d; else (iii) M_t=M_int.

Stage 615 includes asking if b_full is less than b_min. If the answer is negative stage 615 is followed by stage 625. If the answer is positive then stage 615 is followed by stage 620 of reducing b_min. Stage 620 is followed by stage 615.

Stage 625 includes asking if b_d<b_min. If the answer is negative stage 625 is followed by stage 640. If the answer is positive then stage 625 is followed by stage 630 of setting M_t to M_d (M_t=M_d). Stage 630 is followed by stage 645.

Stage 640 includes setting M_t to M_int (M_t=M_int). Stage 640 is followed by stage 645.

Stage 645 includes training the line to bit rate b_min with target SNR margin M_t.

Figure 7:
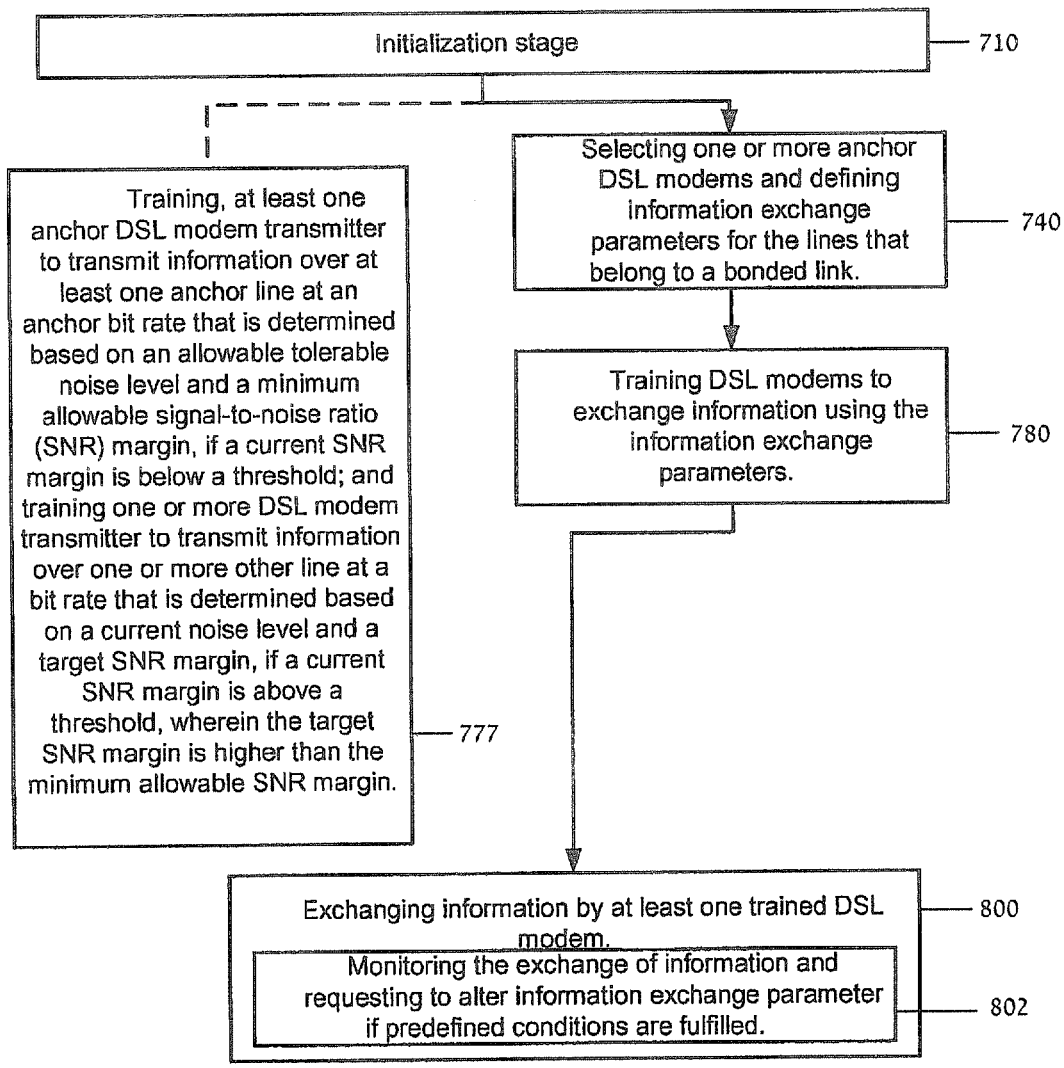
FIG. 7 illustrates a method according to an embodiment of the invention.

FIG. 7 illustrates method 700 according to an embodiment of the invention. Method 700 starts by initialization stage 710. Stage 710 may include receiving requirements relating to lines of a bonded link. Stage 710 may include receiving a target SNR margin, a minimum SNR margin, a minimum bit rate of the bonded link, a desired bit rate of the bonded link, and one or more noise characteristics such as a maximum amount of crosstalk (N_max) that the bonded link should be able to tolerate without retraining, a maximum number of disturbers d_max that the bonded link should be able to tolerate without retraining, and the like.

Stage 710 is followed by stage 740 of selecting one or more anchor modems and defining information exchange parameters for the lines that belong to a bonded link.

Stage 740 may include at least one of stages 741, 742, 743, 744, 745, 746, 747, 748, 749, 750 and 751 or a combination thereof. These stages are illustrated in FIG. 8.

Stage 741 includes calculating, for each line of the bonded link, a minimum line bit rate that corresponds to the minimum allowable SNR margin and to an allowable tolerable line noise level.

Stage 742 includes selecting at least one anchor line so that a sum of minimum line bit rates of the anchor lines is not lower than a bonded link minimum bit rate.

Stage 743 includes ranking lines of the bonded link according to excess line bit rate gained from applying self crosstalk cancellation; and selecting the at least one anchor line based on the ranking of the lines.

Stage 744 includes calculating, for each line of the bonded link, a current line bit rate that corresponds to the target SNR margin and to a current line noise level at an absence of self crosstalk cancellation.

Stage 745 includes calculating, for each line of the bonded link, a current line bit rate that corresponds to the target SNR margin and to a current line noise level assuming that self crosstalk cancellation is applied.

Stage 746 includes arbitrarily selecting the at least one anchor lines.

Stage 747 includes selecting an anchor line based on a possible exposure of the anchor line to noise induced by one or more noise inducing lines, wherein the noise may not be cancelled by self crosstalk cancellation.

Stage 748 includes ranking lines of the bonded link based on a number of noise inducing lines that are expected to induce noise that may not be cancelled by self crosstalk cancellation.

Stage 749 includes calculating the allowable tolerable noise level based on a self crosstalk cancellation applied on the at least one anchor line.

Stage 750 includes calculating the allowable tolerable noise level at an absence of self crosstalk cancellation.

Stage 751 includes calculating the allowable tolerable noise level based on a maximum allowable number of disturbers and an estimation of a noise level that is generated at the at least one line due to the disturbers.

Stage 740 is followed by stage 780 of training DSL modems to exchange Information using the information exchange parameters. These parameters were defined during stage 740. Stage 780 includes at least one of stages 781, 782, 783, 784, 785, 786 and 787 or a combination thereof. These stages are illustrated in FIG. 9.

Stage 781 includes training at least one anchor DSL modem transmitter to transmit information over at least one anchor line at an anchor bit rate that is determined based on an allowable tolerable noise level and a minimum allowable signal-to-noise ratio (SNR) margin and training one or more other DSL modem transmitter to transmit information over one or more other line at a bit rate that is determined based on a current noise level and a target SNR margin, wherein the target SNR margin is higher than the minimum allowable SNR margin.

Stage 782 includes training each anchor DSL modem transmitter to transmit at a minimum line bit rate of the selected line.

Stage 783 includes training at least one anchor DSL modem transmitter to transmit information over at least one anchor link at the anchor bit rate that is determined based on the selected allowable tolerable noise level and the minimum allowable SNR margin.

Stage 784 includes training a minimum number of anchor DSL modem transmitters to transmit information over one or more anchor link at the anchor bit rate, wherein the anchor bit rate is determined based on the allowable tolerable noise level and the minimum allowable SNR margin.

Stage 785 includes training at least one further DSL modem transmitter to transmit information over at least one further link at a further bit rate that is determined based on an intermediate noise level and an intermediate SNR margin; wherein the intermediate SNR margin is lower then the target SNR margin and higher than the minimum SNR margin.

Stage 786 includes training at least one anchor DSL modem transmitter to transmit information over at least one anchor line at an anchor bit rate that is determined based on the allowable tolerable noise level, the minimum allowable SNR margin and at least one parameter out of a attenuation of the anchor line, equivalent working length of a loop that comprises the anchor line and a quiet line noise of the anchor line.

Stage 787 includes training at least one anchor DSL modem to transmit in a downstream anchor bit rate and to receive at an upstream anchor bit rate; wherein the anchor downstream bit rate equals a lower bit rate out of a target downstream bit rate and a current downstream bit rate, wherein the current downstream bit rate is obtainable while maintaining the target SNR margin, applying self crosstalk cancellation and at a current noise level.

Stage 780 is followed by stage 800 of exchanging information by at least one trained DSL modem. Stage 800 may include transmitting information by a DSL modem transmitter, receiving information by a DSL modem receiver or a combination thereof.

Stage 800 may include stage 802 of monitoring the exchange of information and requesting to alter at least one information exchange parameter if predefined conditions are fulfilled. For example, stage 802 may include monitoring the exchange of information and configuring a DSL modem to operate as an anchor DSL modem with different bitloading maps when a current SNR margin does not exceed the minimum allowable SNR margin.

According to an embodiment of the invention stage 710 may be followed by stage 777 of training, at least one anchor DSL modem transmitter to transmit information over at least one anchor line at an anchor bit rate that is determined based on an allowable tolerable noise level and a minimum allowable SNR margin, if a current SNR margin is below a threshold; and training one or more DSL modem transmitter to transmit information over one or more other line at a bit rate that is determined based on a current noise level and a target SNR margin, if a current SNR margin is above a threshold, wherein the target SNR margin is higher than the minimum allowable SNR margin. Stage 777 can include any combination of stages of method 444 or 555.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for configuring a digital subscriber loop (DSL) communication system, the method comprising:
   training at least one anchor DSL modem transmitter to transmit information over at least one anchor line of a plurality of anchor lines at an anchor bit rate that is determined based on an allowable tolerable noise level and a minimum allowable signal-to-noise ratio (SNR) margin;
   training one or more other DSL modem transmitter to transmit information over one or more other line at a bit rate that is determined based on a current noise level and a target SNR margin, wherein the target SNR margin is higher than the minimum allowable SNR margin; and
   transmitting information by at least one of the trained DSL modem transmitters;
   wherein the at least one anchor link and the one or more other link belong to a bonded link.

2. The method according to claim 1 comprising:
   calculating, for each line of the bonded link, a minimum line bit rate that corresponds to the minimum allowable SNR margin and to an allowable tolerable line noise level; and
   selecting the at least one anchor line so that a sum of minimum line bit rates of the anchor lines is not lower than a bonded link minimum bit rate; and
   training each anchor DSL modem transmitter to transmit at a minimum line bit rate of the selected line.

3. The method according to claim 2 comprising ranking lines of the bonded link according to excess line bit rate gained from applying self crosstalk cancellation; and selecting the at least one anchor line based on the ranking of the lines.

4. The method according to claim 3 comprising calculating the excess line bit rate, wherein the calculating of the excess line bit rate comprises calculating for each line of the bonded link, the current line bit rate that corresponds to the target SNR margin and to a current line noise level at an absence of self crosstalk cancellation.

5. The method according to claim 3 comprising calculating the excess line bit rate, wherein the calculating of the excess line bit rate comprises calculating, for each line of the bonded link, the current line bit rate that corresponds to the target SNR margin and to a current line noise level assuming that self crosstalk cancellation is applied.

6. The method according to claim 2 comprising arbitrarily selecting the at least one anchor line.

7. The method according to claim 1 comprising selecting the anchor line based on a possible exposure of the anchor line to noise induced by one or more noise inducing lines, wherein the noise is not cancelled by self crosstalk cancellation.

8. The method according to claim 1 comprising selecting the anchor line based on couplings between the anchor line and other lines of the bonded link.

9. The method according to claim 1 comprising ranking lines of the bonded link based on a number of noise inducing lines that are expected to induce noise that is not cancelled by self crosstalk cancellation.

10. The method according to claim 1 comprising calculating the allowable tolerable noise level based on a self crosstalk cancellation applied on the at least one anchor line.

11. The method according to claim 1 comprising calculating the allowable tolerable noise level at an absence of self crosstalk cancellation.

12. The method according to claim 1 comprising calculating the allowable tolerable noise level based on a maximum allowable number of disturbers and an estimation of a noise level that is generated at the at least one anchor line due to the disturbers.

13. The method according to claim 1 comprising receiving a selection indication that is indicative of a selected allowable tolerable noise level out of multiple allowable tolerable noise levels; and training said at least one anchor DSL modem transmitter to transmit information over said at least one anchor link at the anchor bit rate that is determined based on the selected allowable tolerable noise level and the minimum allowable SNR margin.

14. The method according to claim 1 comprising training a minimum number of anchor DSL modem transmitters to transmit information over one or more anchor link at their corresponding anchor bit rate, wherein the anchor bit rate is determined based on the allowable tolerable noise level and the minimum allowable SNR margin.

15. The method according to claim 1 comprising training at least one further DSL modem transmitter to transmit information over at least one further link at a further bit rate that is determined based on an intermediate noise level and an intermediate SNR margin; wherein the intermediate SNR margin is lower than the target SNR margin and higher than the minimum SNR margin.

16. The method according to claim 1 comprising training said at least one anchor DSL modem transmitter to transmit information over said at least one anchor line at the anchor bit rate that is determined based on the allowable tolerable noise level, the minimum allowable SNR margin and at least one parameter out of an attenuation of the at least one anchor line, an equivalent working length of a loop that comprises the at least one anchor line and a quiet line noise of the at least one anchor line.

17. The method according to claim 1 comprising:
   training said at least one anchor DSL modem transmitter to transmit information over said at least one anchor line at the anchor bit rate and at an anchor bitloading map that are determined based on the allowable tolerable noise level and the minimum allowable SNR margin; and
   training said one or more other DSL modem transmitter to transmit information over said one or more other line at a bit rate and at a current bitloading map that are determined based on the current noise level and the target SNR margin, wherein the target SNR margin is higher than the minimum allowable SNR margin.

18. The method according to claim 1 comprising training said at least one anchor DSL modem to transmit in a downstream anchor bit rate and to receive at an upstream anchor bit rate; wherein the anchor downstream bit rate equals a lower bit rate out of a target downstream bit rate and a current downstream bit rate, wherein the current downstream bit rate is obtained while maintaining the target SNR margin, applying self crosstalk cancellation and at the current noise level.

19. The method according to claim 1 comprising monitoring exchange of information by at least one of the trained DSL modems and requesting to alter at least one information exchange parameter if predefined conditions are fulfilled.

20. A method for configuring a digital subscriber loop (DSL) communication system, the method comprising:
receiving a minimum bit rate (b_min) required for the operation of a line;
receiving a maximum level of crosstalk noise (N_max) that the line is able to tolerate without service interruption;
receiving an intermediate signal-to-noise ratio (SNR) margin (M_int) that allows the line to remain operational despite SNR reductions that are not related to crosstalk noise;
calculating a first maximum bit rate (b_full) that the line supports at M_int in the presence of N_max;
training a DSL modem transmitter to transmit information at the minimum bit rate (b_min) and at the intermediate SNR margin (M_int) if b_full is greater than or equal to B_min.

21. A digital subscriber loop (DSL) communication system that comprises a processing unit and a first set of DSL modems,
wherein the first set of DSL modems are coupled over multiple lines to a second set of DSL modems; and
wherein the processing unit is configured to:
train at least one anchor DSL modem transmitter of the first set of DSL modems to transmit information over at least one anchor line of a plurality of anchor lines at an anchor bit rate that is determined based on an allowable tolerable noise level and a minimum allowable signal-to-noise ratio (SNR) margin; and
train one or more other DSL modem transmitter to transmit information over one or more other line at a bit rate that is determined based on a current noise level and a target SNR margin,
wherein the target SNR margin is higher than the minimum allowable SNR margin; and
wherein after being trained, at least one trained DSL modem transmitter of the first set of DSL modems is configured to transmit information to at least one DSL modem of the second set of DSL modems, wherein the at least one anchor link and the one or more other link belong to a bonded link.

22. The system according to claim 21 wherein the processing unit is configured to: calculate, for each line of the bonded link, a minimum line bit rate that corresponds to the minimum allowable SNR margin and to an allowable tolerable line noise level; select the at least one anchor line so that a sum of minimum line bit rates of the anchor lines is not lower than a bonded link minimum bit rate; and train each anchor DSL modem transmitter to transmit at a minimum line bit rate of the selected line.

23. The system according to claim 22 wherein the processing unit is configured to rank lines of the bonded link according to excess line bit rate gained from applying self crosstalk cancellation; and to select the at least one anchor line based on the ranking of the lines.

24. The system according to claim 23 wherein the processing unit is configured to calculate the excess line bit rate, wherein the calculation of the excess bit rate comprises calculating, for each line of the bonded link, the current line bit rate that corresponds to the target SNR margin and to a current line noise level at an absence of self crosstalk cancellation.

25. The system according to claim 23 wherein the processing unit is configured to calculate the excess line bit rate, wherein the calculation of the excess bit rate comprises calculating, for each line of the bonded link, the current line bit rate that corresponds to the target SNR margin and to a current line noise level assuming that self crosstalk cancellation is applied.

26. The system according to claim 22 wherein the processing unit is configured to arbitrarily select the at least one anchor line.

27. The system according to claim 21 wherein the processing unit is configured to select said anchor line based on a possible exposure of the anchor line to noise induced by one or more noise inducing lines, wherein the noise is not cancelled by self crosstalk cancellation.

28. The system according to claim 21 wherein the processing unit is configured to select said anchor line based on couplings between the anchor line and other lines of the bonded link.

29. The system according to claim 21 wherein the processing unit is configured to rank lines of the bonded link based on a number of noise inducing lines that are expected to induce noise that is not cancelled by self crosstalk cancellation.

30. The system according to claim 21 wherein the processing unit is configured to calculate the allowable tolerable noise level based on a self crosstalk cancellation applied on the at least one anchor line.

31. The system according to claim 21 wherein the processing unit is configured to calculate the allowable tolerable noise level at an absence of self crosstalk cancellation.

32. The system according to claim 21 wherein the processing unit is configured to calculate the allowable tolerable noise level based on a maximum allowable number of disturbers and an estimation of a noise level that is generated at the at least one anchor line due to the disturbers.

33. The system according to claim 21 wherein the processing unit is configured to receive selection indication that is indicative of a selected allowable tolerable noise level out of multiple allowable tolerable noise levels; and train said at least one anchor DSL modem transmitter to transmit information over said at least one anchor link at the anchor bit rate that is determined based on the selected allowable tolerable noise level and the minimum allowable SNR margin.

34. The system according to claim 21 wherein the processing unit is configured to train a minimum number of anchor DSL modem transmitters to transmit information over one or more anchor link at their corresponding anchor bit rate, wherein the anchor bit rate is determined based on the allowable tolerable noise level and the minimum allowable SNR margin.

35. The system according to claim 21 wherein the processing unit is configured to train said at least one anchor DSL modem transmitter to transmit information over said at least one anchor line at the anchor bit rate that is determined based on the allowable tolerable noise level, the minimum allowable SNR margin and at least one parameter out of an attenuation of the anchor line, an equivalent working length of a loop that comprises the anchor line and a quiet line noise of the anchor line.

36. The system according to claim 21 wherein the processing unit is configured to train said at least one anchor DSL modem transmitter to transmit information over said at least one anchor line at the anchor bit rate and at an anchor bitloading map that are determined based on the allowable tolerable noise level and the minimum allowable SNR margin; and train said one or more other DSL modem transmitter to transmit information over said one or more other line at a bit rate and at a current bitloading map that are determined based on the current noise level and the target SNR margin, wherein the target SNR margin is higher than the minimum allowable SNR margin.

37. The system according to claim 21 wherein the processing unit is configured to train said at least one anchor DSL modem to transmit in a downstream anchor bit rate and to receive at an upstream anchor bit rate; wherein the anchor downstream bit rate equals a lower bit rate out of a target downstream bit rate and a current downstream bit rate, wherein the current downstream bit rate is obtained while maintaining the target SNR margin, applying self crosstalk cancellation and at the current noise level.

38. The system according to claim 21 wherein the processing unit is configured to monitor exchange of information by said at least one trained DSL modems and request to alter at least one information exchange parameter if predefined conditions are fulfilled.

39. A digital subscriber loop (DSL) communication system that comprises a processing unit and a first DSL modem that is coupled over a line to a second DSL modem,
wherein the processing unit is configured to:
receive a minimum bit rate (b_min) required for the operation of a line;
receive a maximum level of crosstalk noise (N_max) that the line should be able to tolerate without service interruption;
receive an intermediate signal-to-noise ratio (SNR) margin (M_int) that allows the line to remain operational despite SNR reductions that are not related to crosstalk noise;
calculate a first maximum bit rate (b_full) that the line should support at M_int in the presence of N_max; and
train the first DSL modem to exchange information at the minimum bit rate (b_min) and at the intermediate SNR margin (M_int) if b_full is greater than or equal to b_min.

40. A method for configuring a digital subscriber loop (DSL) communication system, the method comprising:
training at least one anchor DSL modem transmitter to transmit information over at least one anchor line at an anchor bit rate that is determined based on an allowable tolerable noise level and a minimum allowable signal-to-noise ratio (SNR) margin, if a current SNR margin falls below a threshold;
training one or more DSL modem transmitter to transmit information over one or more other line at a bit rate that is determined based on a current noise level and a target SNR margin, if a current SNR margin is above said threshold, wherein the target SNR margin is higher than the minimum allowable SNR margin; and
exchanging information by at least one of said trained DSL modems.

41. A digital subscriber loop (DSL) communication system that comprises a processing unit,
wherein the processing unit is configured to:
train at least one DSL modem transmitter to transmit information over at least one line at an anchor bit rate that is determined based on an allowable tolerable noise level and a minimum allowable signal-to-noise ratio (SNR) margin, if a current SNR margin is below a threshold; and
train at least one DSL modem transmitter to transmit information over at least one other line at a bit rate that is determined based on a current noise level and a target SNR margin, if a current SNR margin is above said threshold, wherein the target SNR margin is higher than the minimum allowable SNR margin; and
wherein at least two trained DSL modems of the DSL communication system are configured to exchange information.

* * * * *